United States Patent
Mundt et al.

(10) Patent No.: US 7,639,491 B2
(45) Date of Patent: Dec. 29, 2009

(54) METHOD AND APPARATUS FOR COUPLING AN OPTICAL DRIVE TO A CHASSIS

(75) Inventors: Kevin Mundt, Austin, TX (US); David William Grunow, Round Rock, TX (US); Faiza Hassan, Austin, TX (US); Scott Koester, Austin, TX (US); Reynold L. Liao, Austin, TX (US); Jefferson Wirtz, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 559 days.

(21) Appl. No.: 11/392,391

(22) Filed: Mar. 29, 2006

(65) Prior Publication Data
US 2007/0234379 A1  Oct. 4, 2007

(51) Int. Cl.
*G11B 17/03* (2006.01)
(52) U.S. Cl. .................................. 361/679.37; 720/601
(58) Field of Classification Search ............. 361/685, 361/679.37; 720/601
See application file for complete search history.

(56) References Cited

U.S. PATENT DOCUMENTS

| 4,941,841 | A | * | 7/1990 | Darden et al. | 361/679.39 |
|---|---|---|---|---|---|
| 5,726,922 | A | * | 3/1998 | Womble et al. | 361/726 |
| 6,208,506 | B1 | | 3/2001 | Pao | |
| 6,385,156 | B1 | * | 5/2002 | Furukawa et al. | 369/100 |
| 2004/0184184 | A1 | * | 9/2004 | Komatsu et al. | 360/97.01 |
| 2004/0264117 | A1 | * | 12/2004 | Yang et al. | 361/679 |
| 2005/0108737 | A1 | * | 5/2005 | Chang | 720/601 |
| 2005/0198659 | A1 | * | 9/2005 | Ahn et al. | 720/650 |
| 2006/0218565 | A1 | * | 9/2006 | Kajikawa | 720/613 |

* cited by examiner

*Primary Examiner*—Jayprakash N Gandhi
*Assistant Examiner*—Ingrid Wright
(74) *Attorney, Agent, or Firm*—Haynes and Boone, LLP

(57) ABSTRACT

An optical drive apparatus includes a drive tray including an optical drive mechanism, whereby the drive tray is operable to be inserted directly into an information handling system drive bay free of a drive chassis. An information handling system chassis may be provided that accepts the optical drive apparatus and couples the optical drive apparatus to the information handling system without the need of a drive chassis.

22 Claims, 15 Drawing Sheets

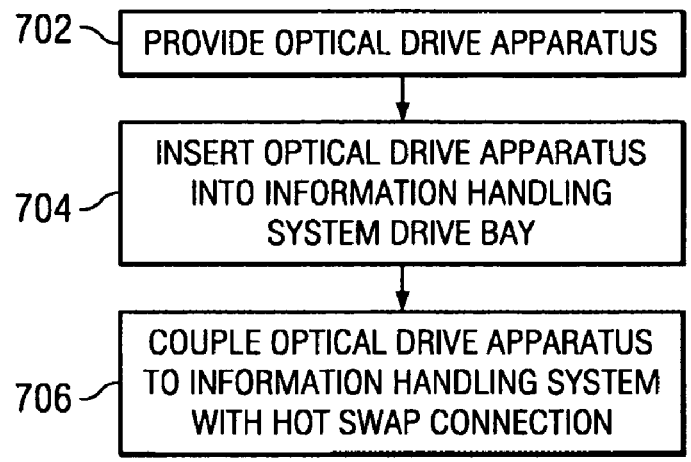
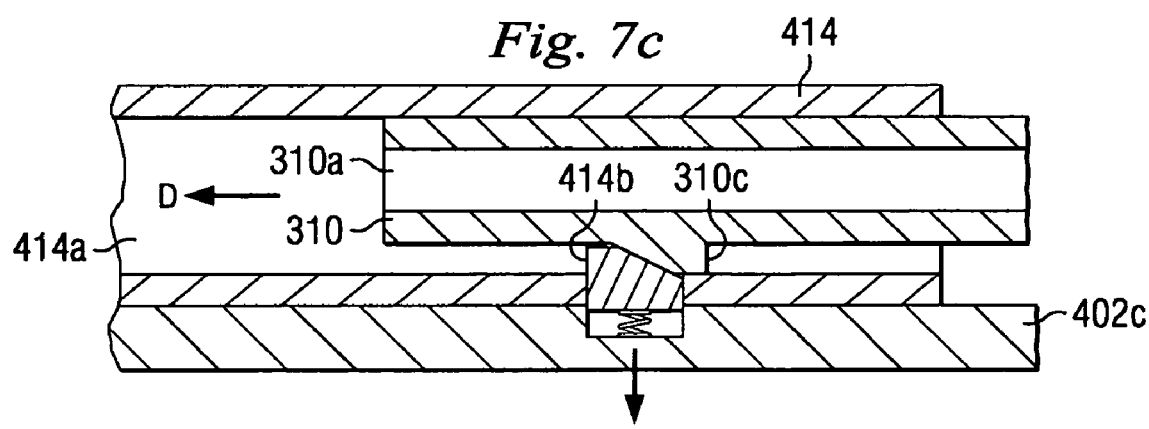

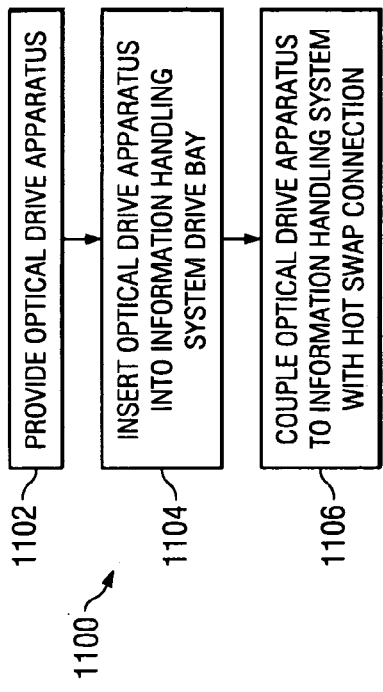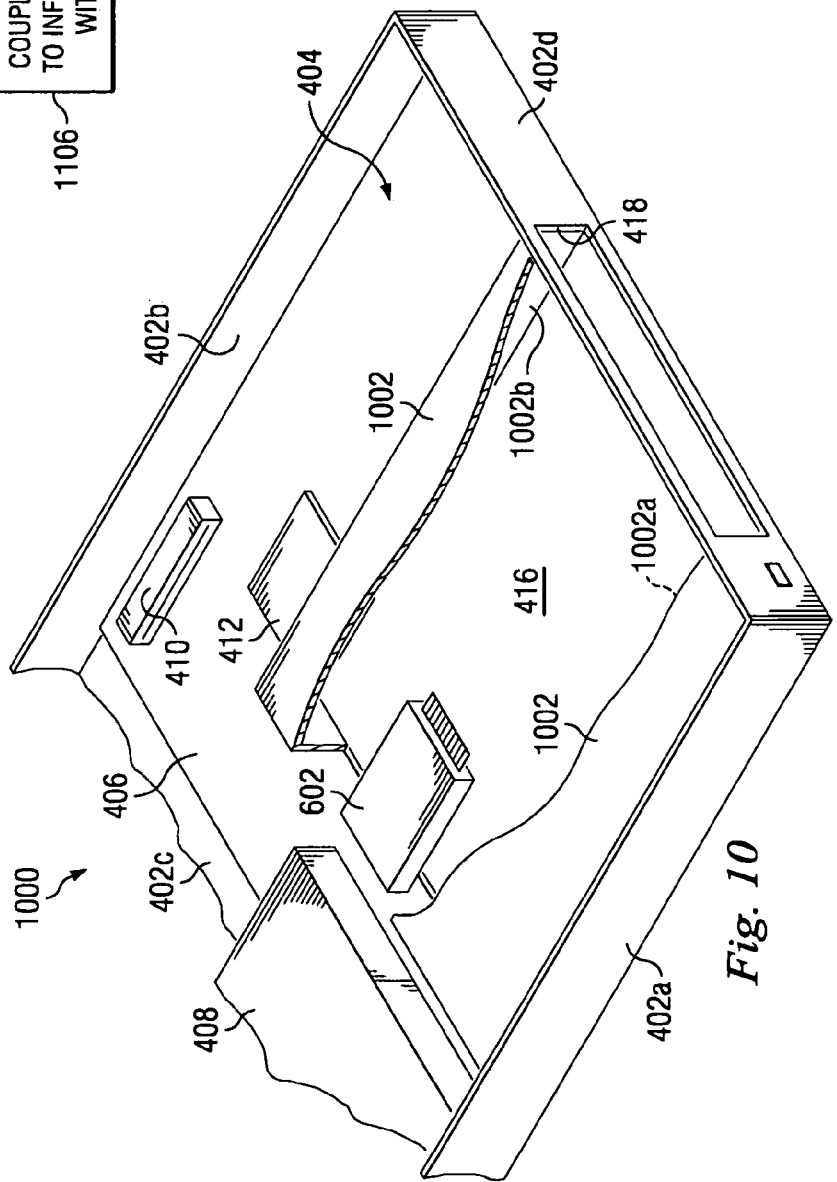

METHOD AND APPARATUS FOR COUPLING AN OPTICAL DRIVE TO A CHASSIS

BACKGROUND

The present disclosure relates generally to information handling systems, and more particularly to a method and apparatus for coupling an optical drive to an information handling system chassis.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For some information handling systems such as, for example, portable notebook computers, there is a desire for the information handling system to be as thin and lightweight as possible. In many of these information handling systems, it is the optical drive that drives the thickness of the information handling system. Such optical drives are typically commodity components which are purchased from different suppliers and which include common dimensions such that the optical drives are exchangeable between a variety information handling systems in order to decrease the cost of the drives.

Conventional optical drives typically include a drive chassis which houses a drive tray that includes the optical drive mechanism. That drive chassis is typically coupled to an information handling system chassis, and the drive tray slides out of the drive chassis in order to allow a user to change removable media from the drive tray. However, this drive mounting solution results in a chassis within a chassis, which adds undesirable weight and thickness to the information handling system.

Accordingly, it would be desirable to provide for coupling an optical drive to a chassis absent the disadvantages found in the prior methods discussed above.

SUMMARY

According to one embodiment, an optical drive apparatus includes a drive tray including an optical drive mechanism, whereby the drive tray is operable to be inserted directly into an information handling system drive bay free of a drive chassis.

BRIEF DESCRIPTION OF THE DRAWINGS

FIG. 7a is a flow chart illustrating an embodiment of a method for coupling an optical drive to an information handling system chassis.

FIG. 7c is a cross sectional view illustrating an embodiment of the optical drive apparatus and the information handling system chassis of FIG. 7b being coupled together.

FIG. 10 is a perspective view illustrating an embodiment of an information handling system chassis.

FIG. 11a is a flow chart illustrating an embodiment of a method for coupling an optical drive to an information handling system chassis.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
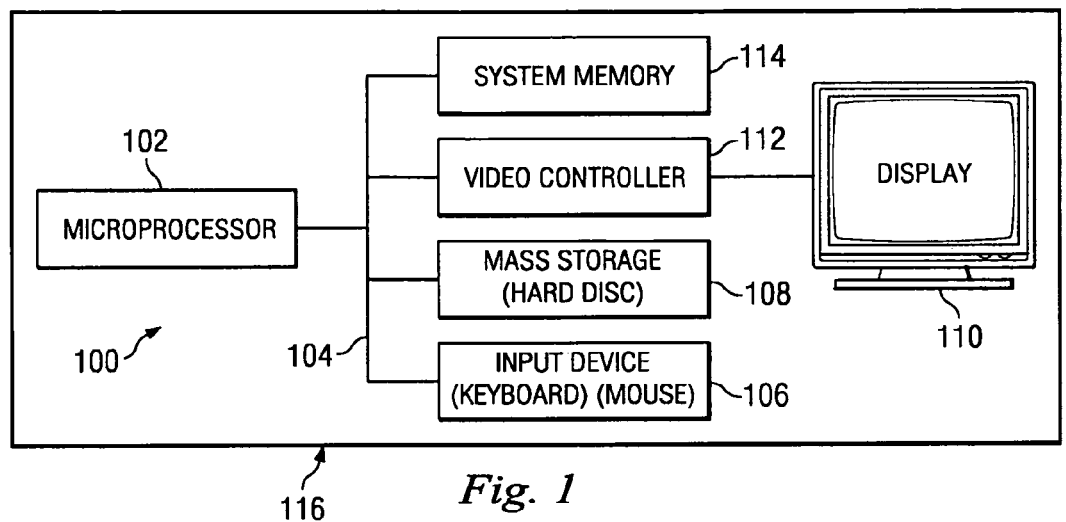
FIG. 1 is a schematic view illustrating an embodiment of an information handling system.

In one embodiment, information handling system 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. Information handling system 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of information handling system 100. It should be understood that other buses and intermediate circuits can be deployed between the components described above and microprocessor 102 to facilitate interconnection between the components and the microprocessor.

Figure 2:
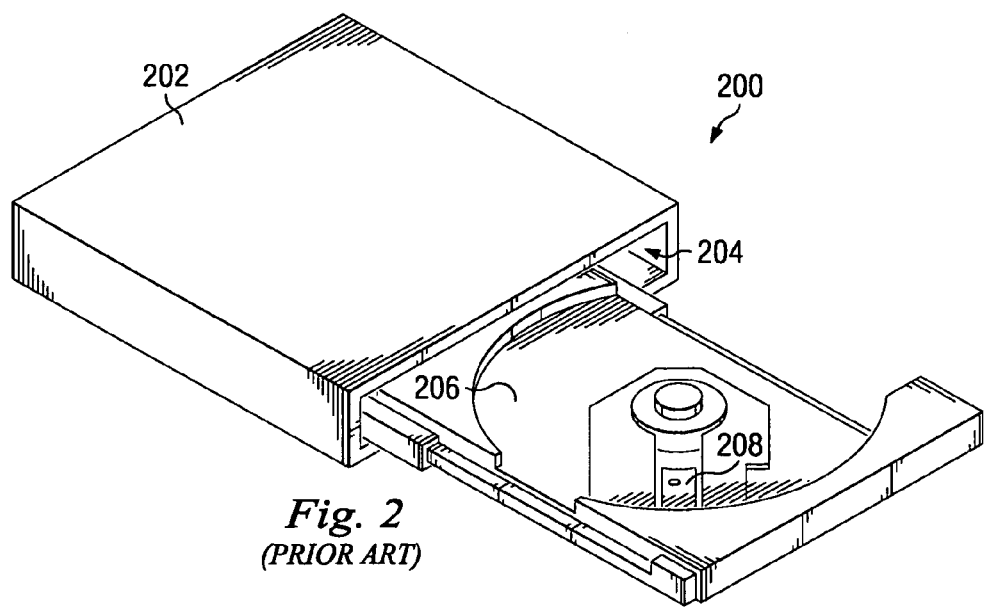
FIG. 2 is a perspective view illustrating an embodiment of a conventional optical drive apparatus.

Referring now to FIG. 2, a conventional optical drive apparatus 200 is illustrated. The conventional optical drive apparatus 200 includes a drive chassis 202 that defines a tray housing 204. A drive tray 206 including an optical drive mechanism 208 is moveably coupled to the drive chassis 202 such that the drive tray 206 may move in and out of the tray housing 204. Typically, the conventional optical drive apparatus 200 is coupled to an information handling system chassis such as, for example, the chassis 116 described above with reference to FIG. 1, by positioning the drive chassis 202 in a drive bay which is defined by the information handling system chassis. Typically, the conventional optical drive apparatus 200 includes a common form factor that has the same dimensions as other conventional drive apparatus in plan view and may vary in thickness such as, for example, 12.7 mm or 9.5 mm, such that information handling system chassis may be manufactured with drive bays which will house conventional optical drive apparatus from a variety of different manufacturers.

Figure 3:
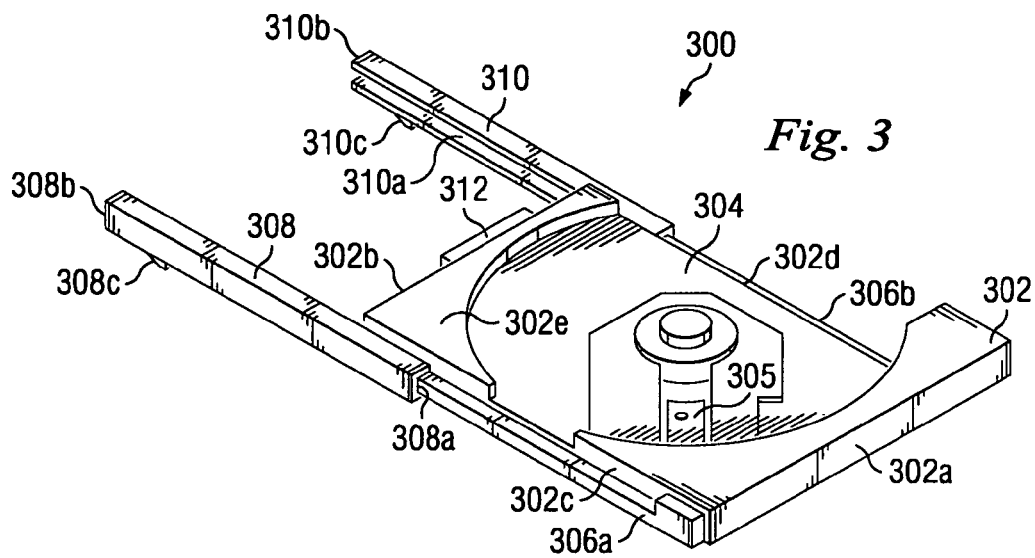
FIG. 3 is a perspective view illustrating an embodiment of an optical drive apparatus.
Figure 5A:
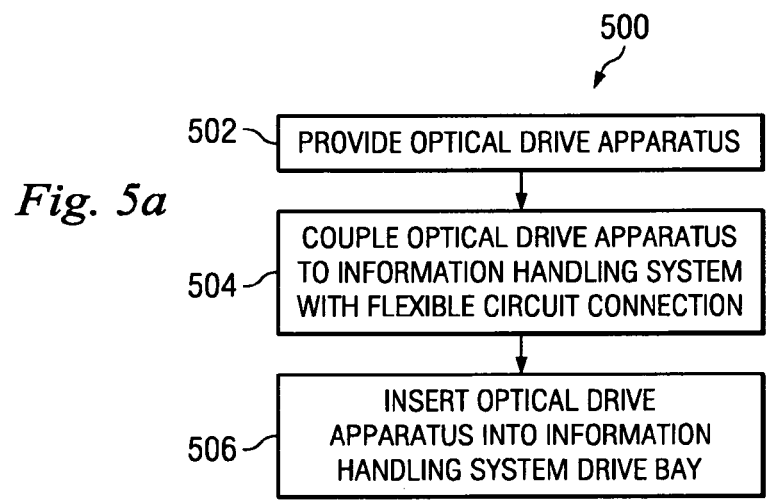
FIG. 5a is a flow chart illustrating an embodiment of a method for coupling an optical drive to an information handling system chassis.
Figure 5C:
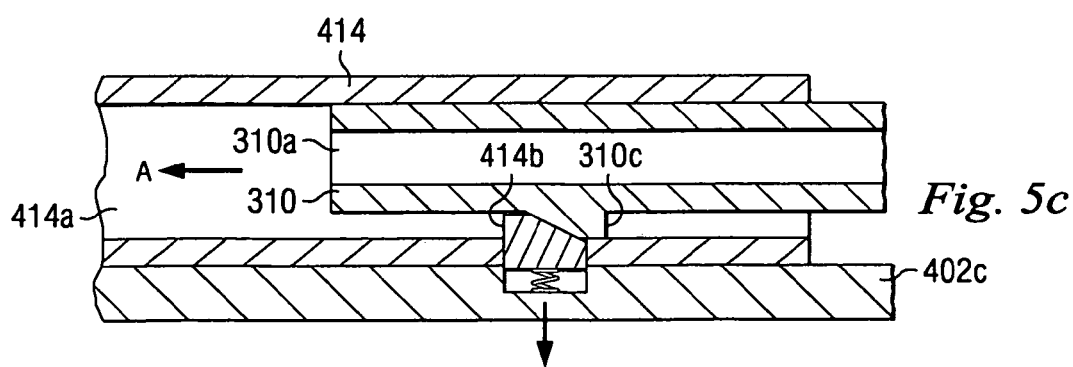
FIG. 5c is a cross sectional view illustrating an embodiment of the optical drive apparatus and the information handling system chassis of FIG. 5b being coupled together.

Referring now to FIG. 3, an optical drive apparatus 300 is illustrated. The optical drive apparatus 300 includes a drive tray 302 having a front edge 302a, a rear edge 302b located opposite the front edge 302a, a side edge 302c extending between the front edge 302a and the rear edge 302b, a side edge 302d located opposite the side edge 302c and extending between the front edge 302a and the rear edge 302b, and a top surface 302e extending between the front edge 302a, the rear edge 302b, and the side edges 302c and 302d. A semi-circular media channel 304 is defined by the drive tray 302 and located adjacent the top surface 302e of the drive tray 302. An optical drive mechanism 305 is moveably coupled to the drive tray 302 and located adjacent the media channel 304. A rail mount 306a extends from the side edge 302c of the drive tray 302 and along a length of the side edge 302c. A rail mount 306b extends from the side edge 302d of the drive tray 302 and along a length of the side edge 302d. A tray drive rail 308 defines a rail channel 308a and slideably couples to the rail mount 306a by positioning the rail mount 306a in the rail channel 308a and moveably coupling them together using methods known in the art. The tray drive rail 308 includes a distal end 308b and an information handling system securing member 308c extending from a bottom surface of the drive rail 308 adjacent the distal end 308b. A tray drive rail 310 defines a rail channel 310a and slideably couples to the rail mount 306b by positioning the rail mount 306b in the rail channel 310a and moveably coupling them together using methods known in the art. The tray drive rail 310 includes a distal end 310b and an information handling system securing member 310c extending from a bottom surface of the drive rail 310 adjacent the distal end 310b. An information handling system connector 312 extends from the rear edge 302b of the drive tray 302 and is substantially centrally located between the side edges 302c and 302d. In an embodiment, the information handling system connector 312 is a flexible circuit connector. In an embodiment, the information handling system connector 312 is a ZIF connector.

Figure 4:
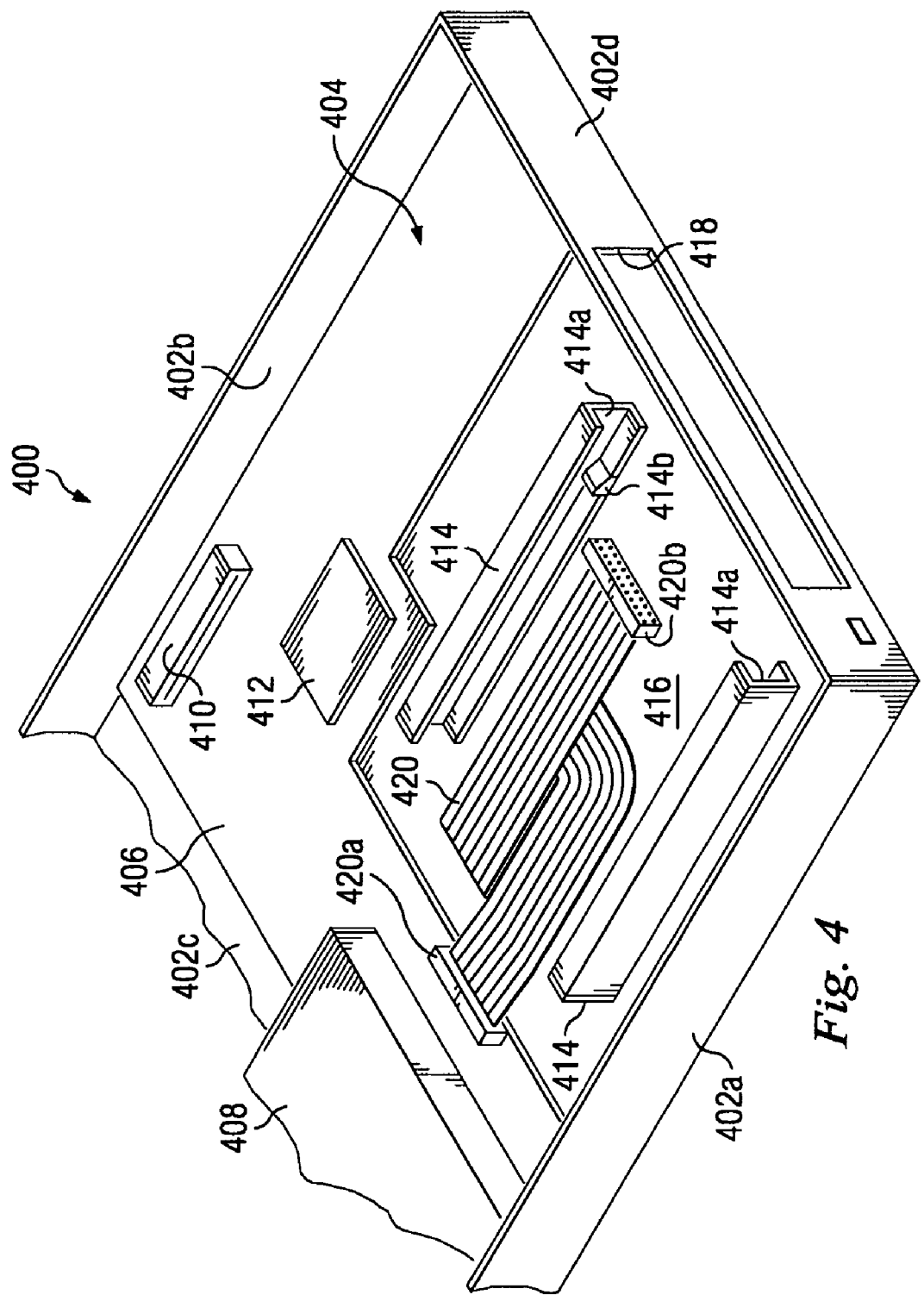
FIG. 4 is a perspective view illustrating an embodiment of an information handling system chassis.

Referring now to FIG. 4, an information handling system chassis 400 is illustrated. In an embodiment, the information handling system chassis 400 may be, for example, the chassis 116, described above with reference to FIG. 1, and may includes some or all of the components of the information handling system 100, described above with reference to FIG. 1. The information handling system chassis 400 includes a pair of side walls 402a and 402b which are held in a substantially parallel and spaced apart orientation by a bottom wall 402c. A front wall 402d extends between the side walls 402a and 402b and the bottom wall 402c. The side walls 402a and 402b, the bottom wall 402c, and the front wall 402d define a chassis housing 404 between them. A board 406 is coupled to the bottom wall 402c of the information handling system chassis 400 and located in the chassis housing 404. An information handling system component 408 is coupled to the board 406 and located in the chassis housing 404 adjacent the side wall 402a. A connector 410 is coupled to the board 406 and located in the chassis housing 404 adjacent the side wall 402b. A microprocessor 412, which may be the microprocessor 102, described above with reference to FIG. 1, is coupled to the board 406 and located in the chassis housing 404. A pair of chassis drive rails 414 are coupled the bottom surface 402c of the information handling system chassis 400 in a substantially parallel and spaced apart orientation adjacent the side wall 402a and the front wall 402d. An information handling system drive bay 416 is defined between the chassis drive rails 414. Each chassis drive rail 414 defines a rail channel 414a along the length of the chassis drive rail 414. A drive tray securing member 414b is resiliently biased into the rail channel 414a. A drive bay entrance 418 is defined by the front wall 402d and located adjacent the side wall 402a such that the drive bay entrance 418 provides access through the front wall 402a to the information handling system drive bay 416. A flexible circuit connection 420 includes a board connector 420a which is coupled to the board 406 and that electrically couples the flexible circuit connection 420 to the microprocessor 412. A drive tray connector 420b is coupled to a distal end of the flexible circuit connection 420 opposite the board connector 420a.

Referring now to FIGS. 3, 4, 5a, 5b, a method 500 for coupling an optical drive to an information handling system chassis is illustrated. The method 500 begins at step 502 where the optical drive apparatus 300, illustrated in FIG. 3, is provided. The method 500 then proceeds to step 504 where the optical drive apparatus 300 is coupled to an information handling system such as, for example, the information handling system 100, described above with reference to FIG. 1, housed in the information handling chassis 400. The drive tray 302 is positioned adjacent the front surface 402d of the information handling system chassis 400 such that the distal ends 308b and 310b of the drive tray rails 308 and 310, respectively, are positioned adjacent the drive bay entrance 418, illustrated in FIG. 5b. The drive tray connector 420b on the flexible circuit connector 420 is then extended from the drive bay 416 and through the drive bay entrance 418 and coupled to the information handling system connector 312 on the drive tray 302, illustrated in FIG. 5b, electrically coupling the drive tray 302 to the microprocessor 412 such that the optical drive mechanism 305 may send information read from media in the media channel 304 to the microprocessor 412. In an embodiment, the flexible circuit connection 420 includes a handle or similar means to allow the drive tray connector 420b to be accessed through the drive bay entrance 418 such that the drive tray connector 420b may be extended from the drive bay 416 and through the drive bay entrance 418.

Referring now to FIGS. 5a, 5c, 5d, and 5e, the method 500 proceeds to step 506 where optical drive apparatus 300 is inserted into the information handling system drive bay 416. With the drive tray 302 positioned adjacent the front surface 402d of the information handling system chassis 400, the drive tray 302 is moved in a direction A such that the distal ends 308b and 310b of the tray drive rails 308 and 310, respectively, enter the rail channels 414a defined by the chassis drive rails 414. Further movement of drive tray 302 in the direction A moves the tray drive rail 310 through the rail channel 414a such that the information handling system securing member 310c on the tray drive rail 310 engages the drive tray securing member 414b on the chassis drive rail 414. Engagement of the information handling system securing member 310c and the drive tray securing member 414b moves the drive tray securing member 414b out of the rail channel 414a, illustrated in FIG. 5c, such that tray drive rail 310 may continue to move in the direction A until the information handling system securing member 310c passes the drive tray securing member 414b in the rail channel 414a and the drive tray securing member 414b is resiliently biased back into the rail channel 414a, securing the tray drive rail 310 in the rail channel 414a on chassis drive rail 414, illustrated in FIG. 5d. The discussion above for the securing of the tray drive rail 310 in the rail channel 414a on chassis drive rail 414 applies to the securing of the tray drive rail 308 in the rail channel 414a on chassis drive rail 414.

Figure 5B:
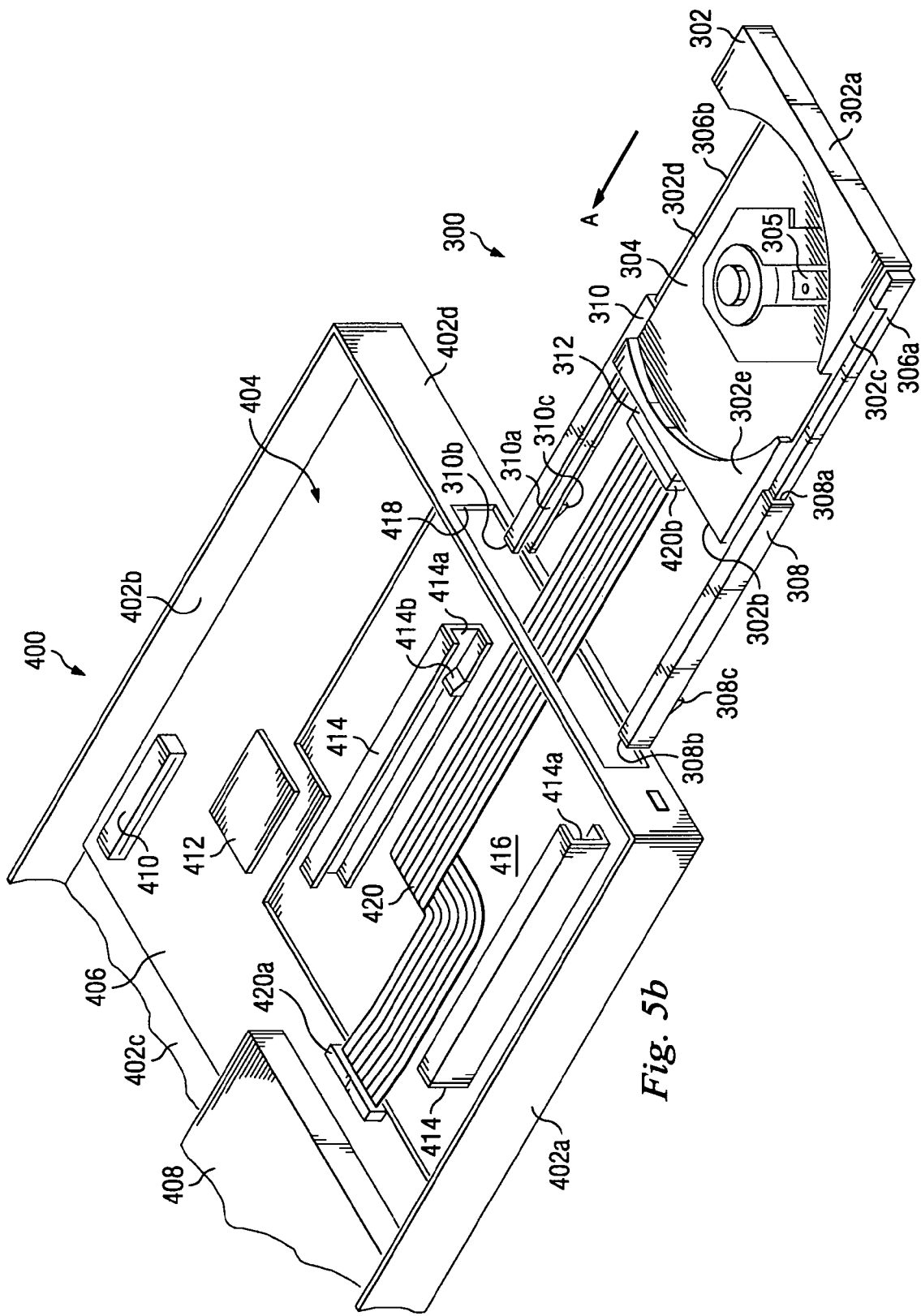
FIG. 5b is a perspective view illustrating an embodiment of the optical drive apparatus of FIG. 3 being coupled to the information handling system chassis of FIG. 4.
Figure 5D:
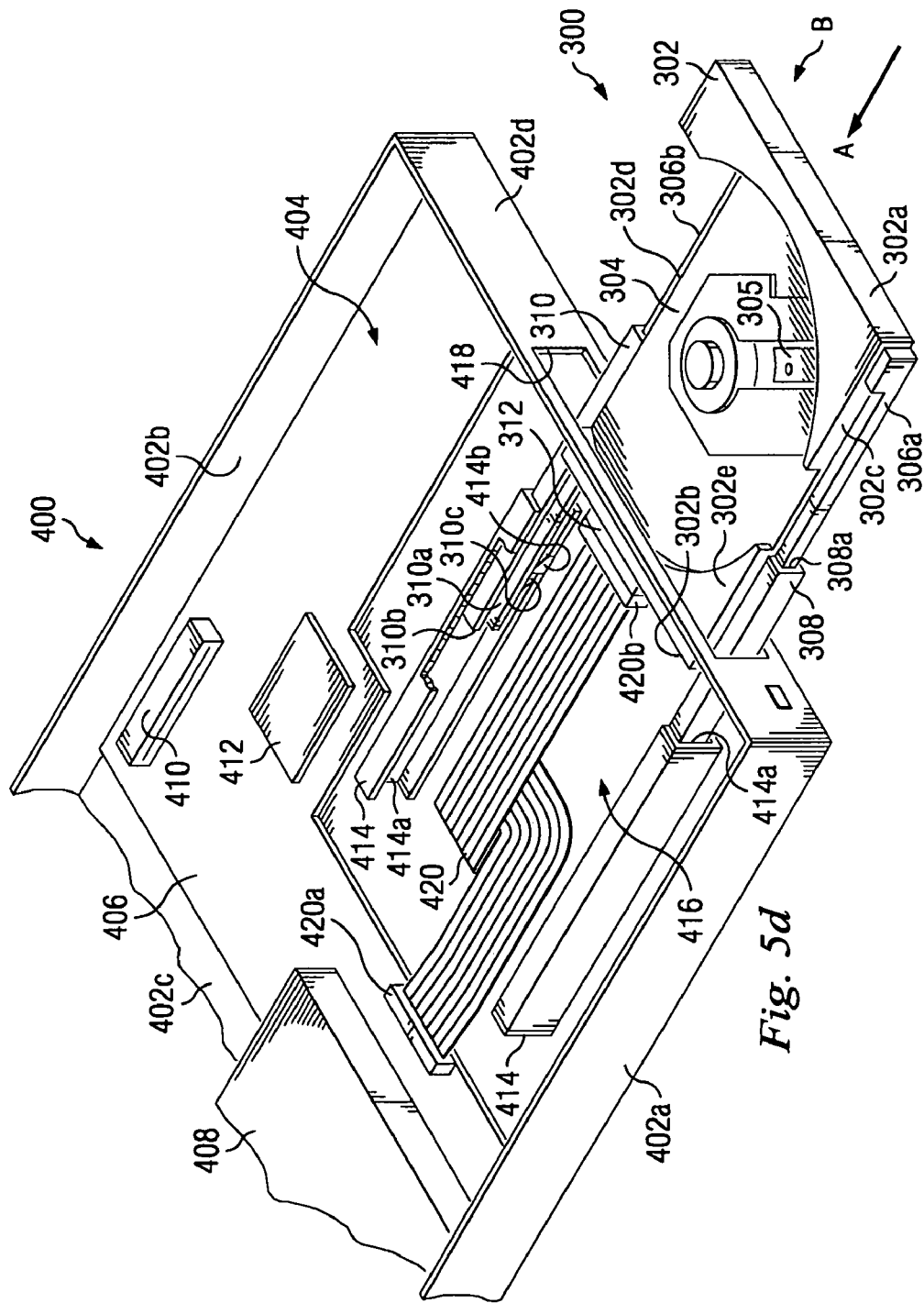
FIG. 5d is a perspective view illustrating an embodiment of the optical drive apparatus of FIG. 3 coupled to the information handling system chassis of FIG. 4 with the optical drive apparatus in an open position.
Figure 5E:
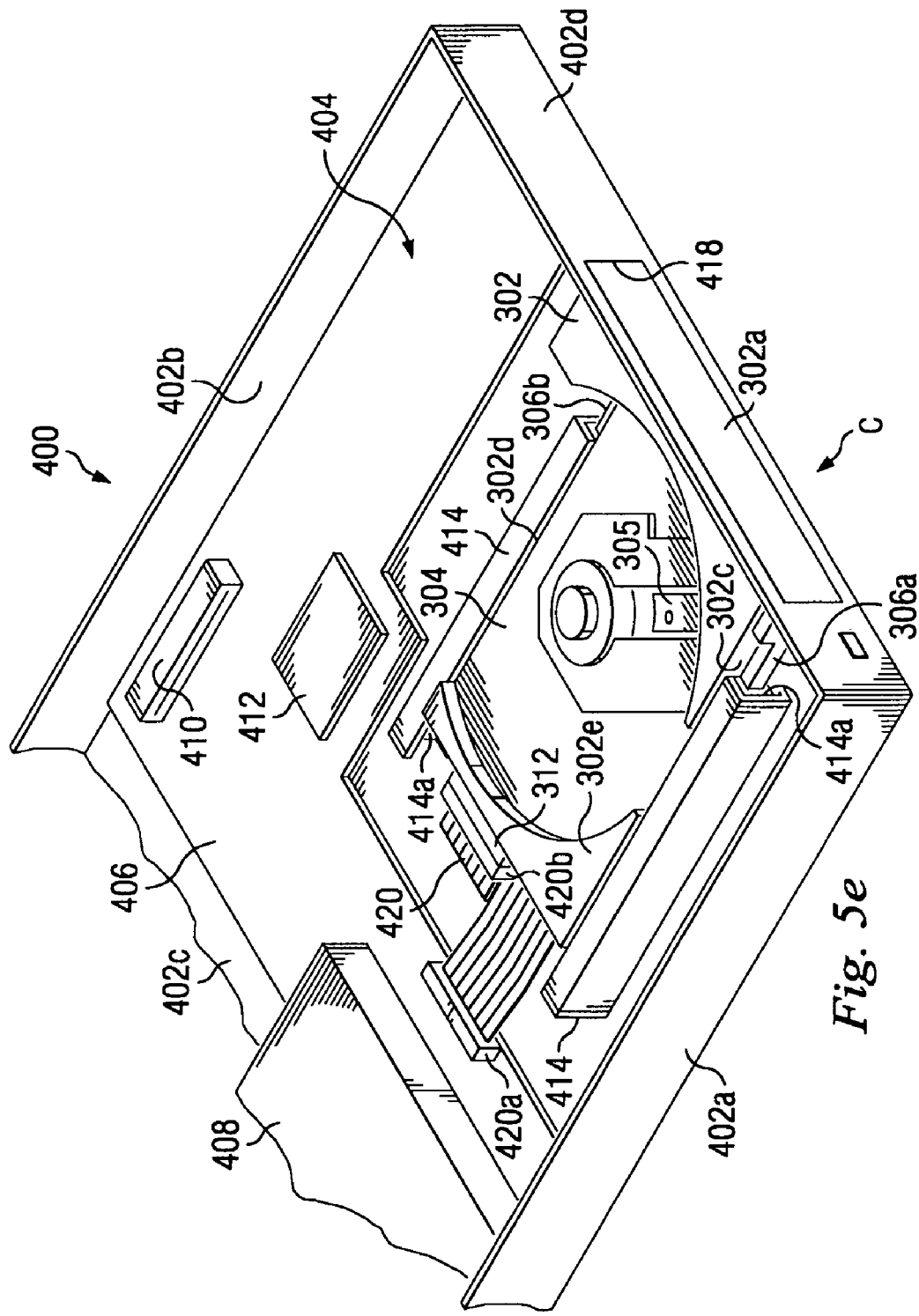
FIG. 5e is a perspective view illustrating an embodiment of the optical drive apparatus of FIG. 3 coupled to the information handling system chassis of FIG. 4 with the optical drive apparatus in a closed position.

The drive tray 302 may now be positioned in an open position B, illustrated in FIG. 5d, with the tray drive rails 308 and 310 secured to the chassis drive rails 414, such that media may be positioned in the media channel 304 on the drive tray 302. The drive tray 302 may be moved in the direction A, and due to the slideable connection between the tray rails 308 and 310 with the rail mounts 306a and 306b, respectively, the drive tray 302 may be moved to a closed position C, illustrated in FIG. 5e, such that the media in the media channel 304 is protected. In an embodiment, the chassis 400 and the drive tray 302 may include securing members for holding the drive tray 302 in the position C. The optical drive apparatus 300 may then be removed from the information handling system chassis 400 by activating a release device (not shown) which resiliently moves the drive tray securing members 414b out of the rail channels 414a such that the tray drive rails 308 and 310 may be removed from the rail channels 414a on the chassis drive rails 414. In an embodiment, the orientation of the chassis drive rails 414 may be standardized such that optical drive apparatus similar to the optical drive apparatus 300 from different manufacturers may be coupled to the chassis drive rails 414. Thus, a method an apparatus are provided which allow an optical drive apparatus 300 to be coupled to an information handling system chassis 400 free of a drive chassis, which allows the thickness of the information handling system chassis 400 to be reduced. In an experimental embodiment, the weight of the optical drive apparatus 300 was reduced by approximately 0.1 pounds relative to the conventional optical drive apparatus 200, and the thickness of the optical drive apparatus 300 was reduced by approximately 2.5 millimeters relative to the conventional optical drive apparatus 200. In an embodiment, the chassis drive rails 414, the drive bay 416, and the flexible circuit connection 420 are operable to accept a variety of different information handling system components such as, for example, a hard disk drive.

Figure 6:
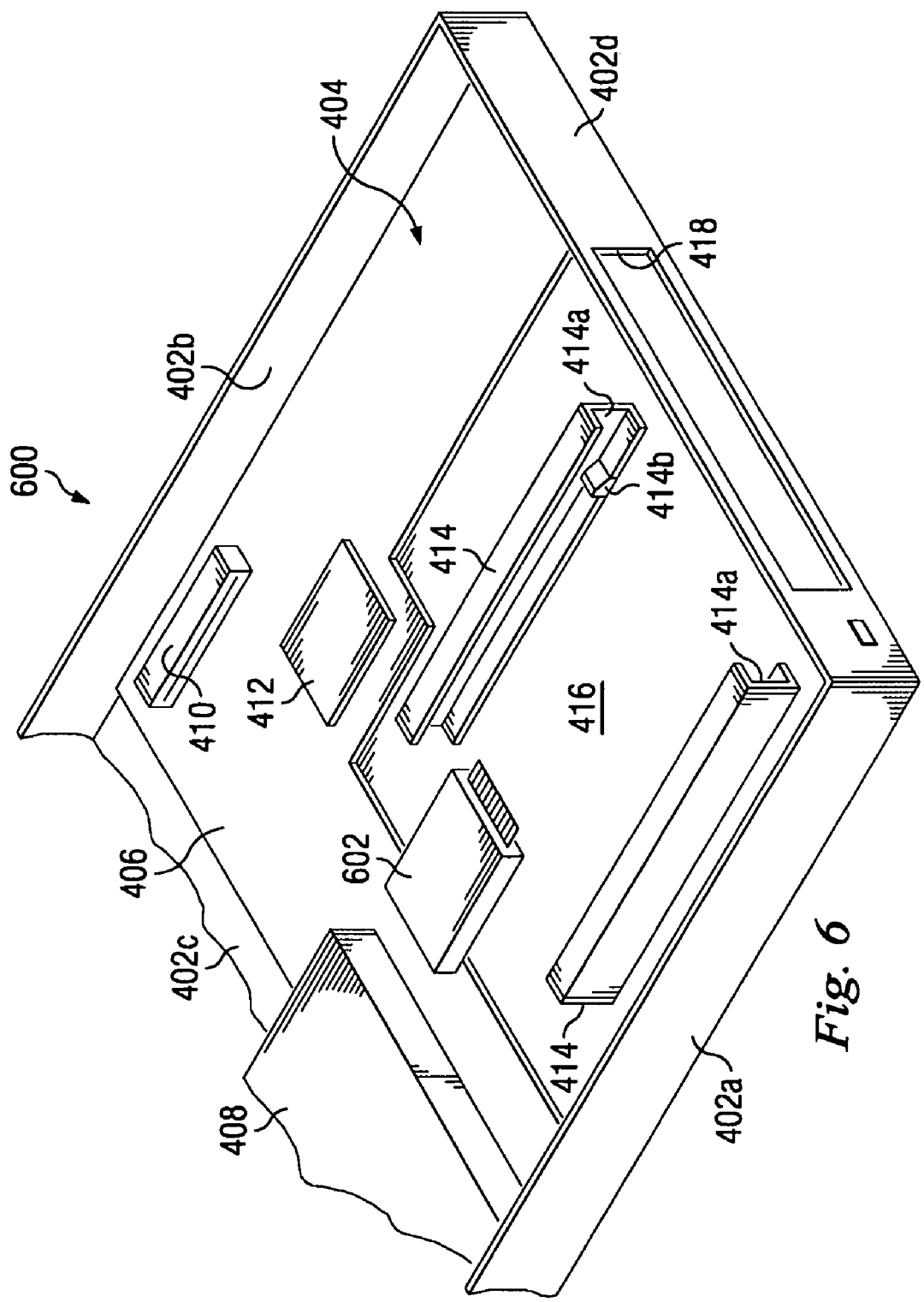
FIG. 6 is a perspective view illustrating an embodiment of an information handling system chassis.

Referring now to FIG. 6, in an embodiment, an information handling system chassis 600 is illustrated that is substantially similar in design and operation to the information handling system chassis 400, described above with reference to FIG. 4, with the provision of a hot swap connection 602 replacing the flexible circuit connection 420. The hot swap connection 602 is coupled to the board 406, electrically coupled to the microprocessor 412, and located adjacent the drive bay 416.

Figure 7B:
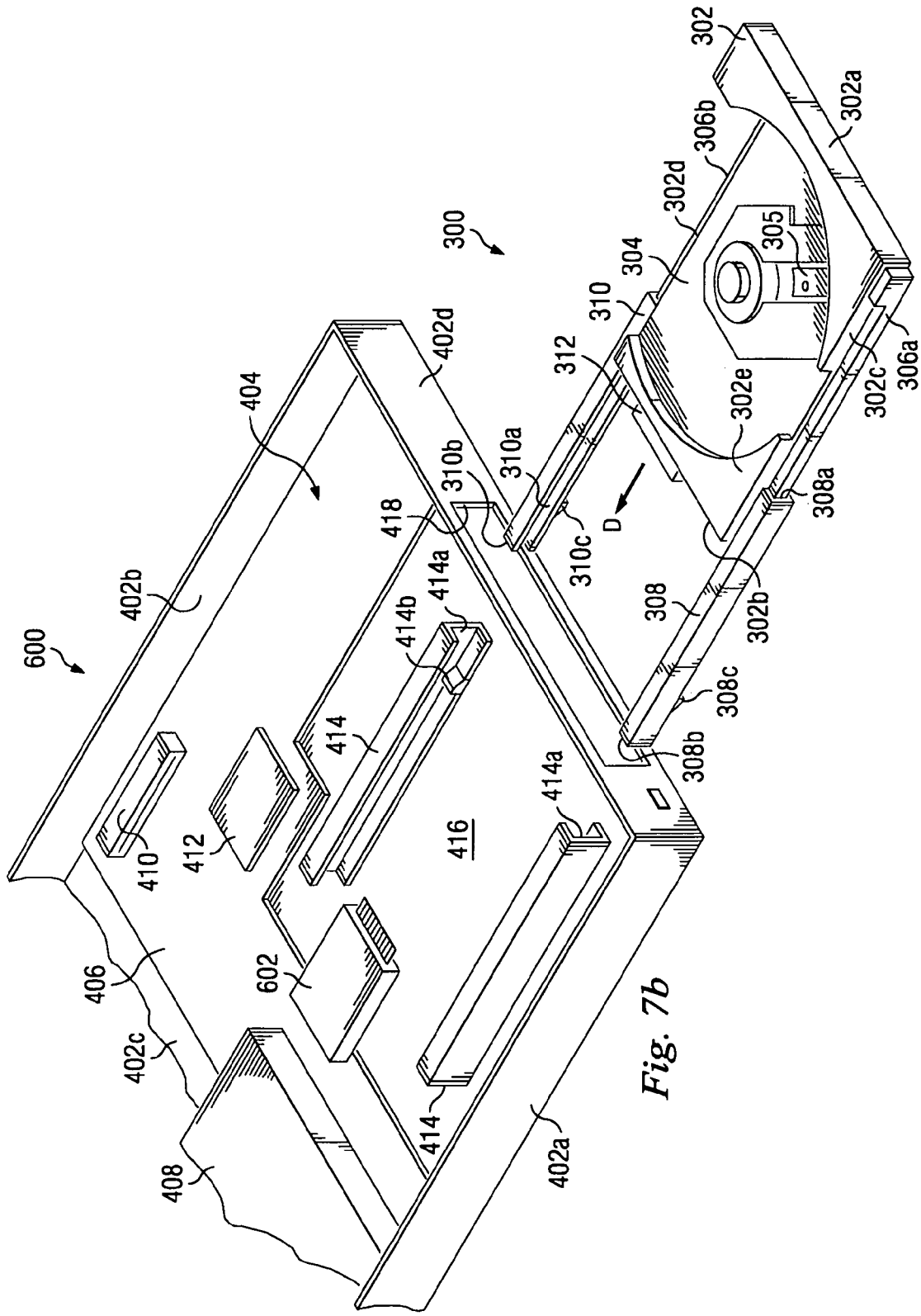
FIG. 7b is a perspective view illustrating an embodiment of the optical drive apparatus of FIG. 3 being coupled to the information handling system chassis of FIG. 6.
Figure 7D:
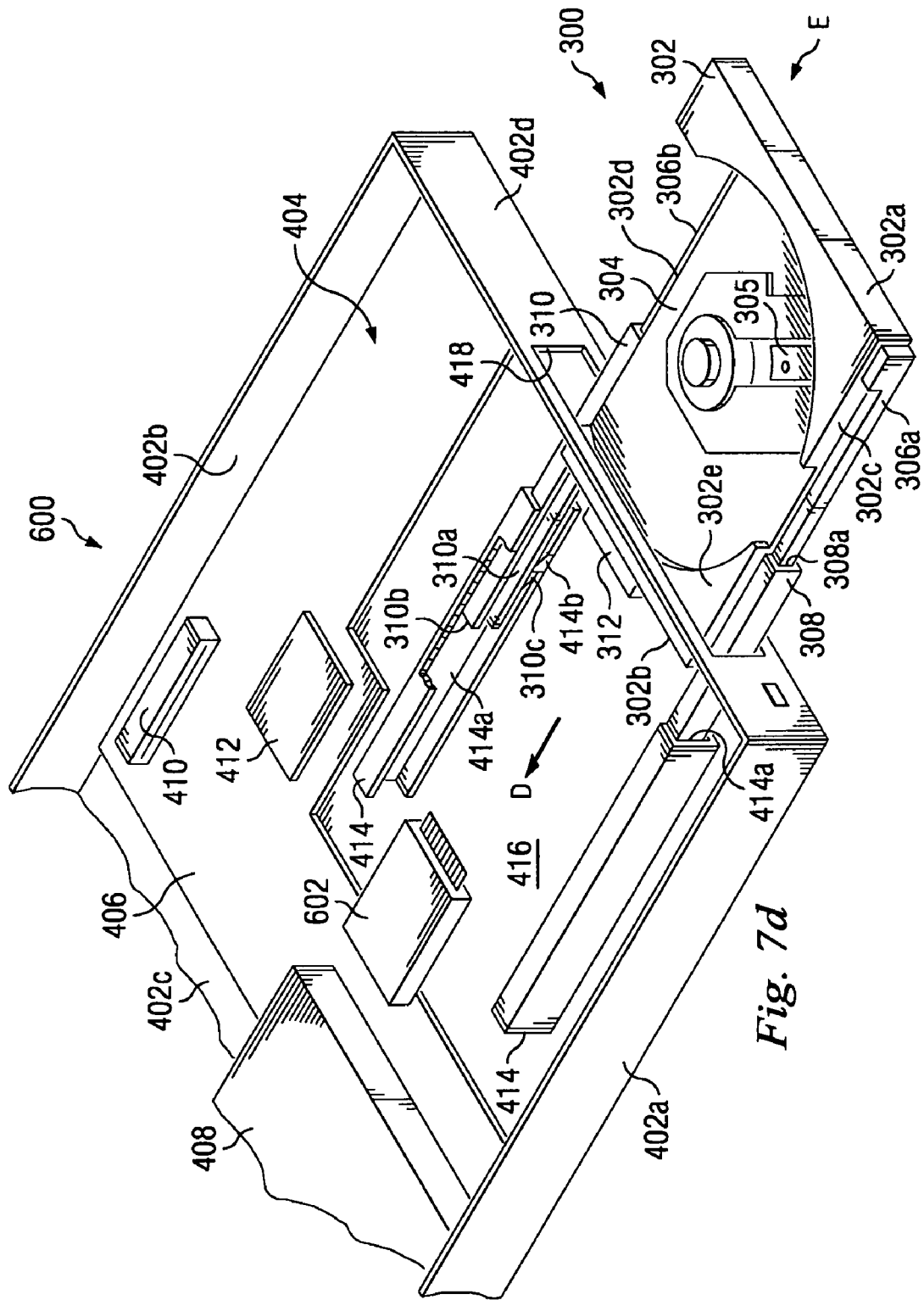
FIG. 7d is a perspective view illustrating an embodiment of the optical drive apparatus of FIG. 3 coupled to the information handling system chassis of FIG. 6 with the optical drive apparatus in an open position.
Figure 7E:
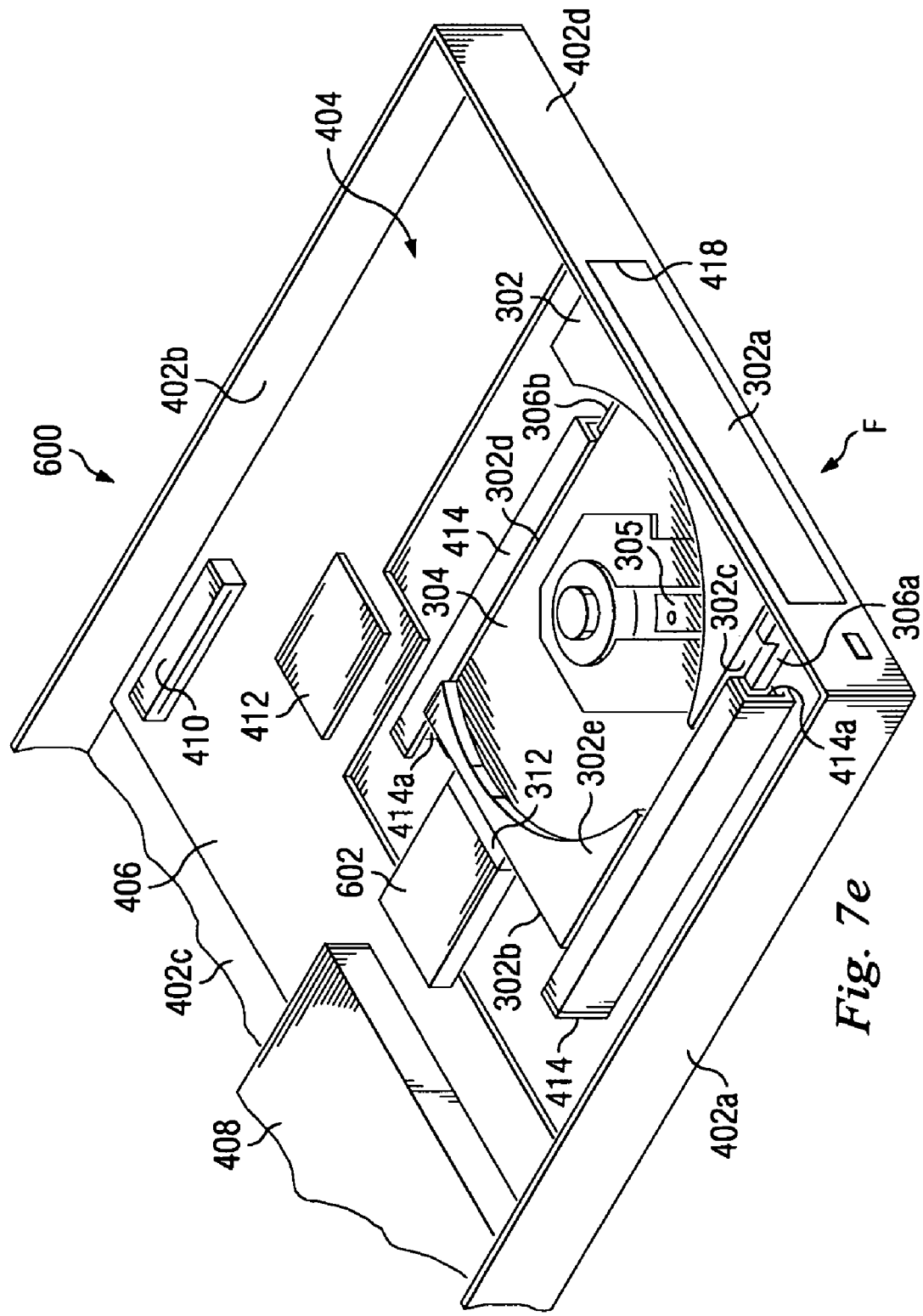
FIG. 7e is a perspective view illustrating an embodiment of the optical drive apparatus of FIG. 3 coupled to the information handling system chassis of FIG. 4 with the optical drive apparatus in a closed position.

Referring now to FIGS. 3, 6, 7a, 7b, and 7c, a method 700 for coupling an optical drive to an information handling system chassis is illustrated. The method 700 begins at step 702 where the optical drive apparatus 300, illustrated in FIG. 3, is provided. The method 700 then proceeds to step 704, where the optical drive apparatus 300 is inserted into the information handling system drive bay 416. With the drive tray 302 positioned adjacent the front surface 402d of the information handling system chassis 600, the drive tray 302 is moved in a direction D such that the distal ends 308b and 310b of the tray drive rails 308 and 310, respectively, enter the rail channels 414a defined by the chassis drive rails 414. Further movement of drive tray 302 in the direction D moves the tray drive rail 310 through the rail channel 414a such that the information handling system securing member 310c on the tray drive rail 310 engages the drive tray securing member 414b on the chassis drive rail 414. Engagement of the information handling system securing member 310c and the drive tray securing member 414b resiliently moves the drive tray securing member 414b out of the rail channel 414a, illustrated in FIG. 7c, such that tray drive rail 310 may continue to move in the direction D until the information handling system securing member 310c passes the drive tray securing member 414b in the rail channel 414a and the drive tray securing member 414b is resiliently biased back into the rail channel 414a, securing the tray drive rail 310 in the rail channel 414a on chassis drive rail 414, illustrated in FIG. 7d. The discussion above for the securing of the tray drive rail 310 in the rail channel 414a on chassis drive rail 414 applies to the securing of the tray drive rail 308 in the rail channel 414a on chassis drive rail 414. The drive tray 302 may now be positioned in an open position E, illustrated in FIG. 5d, with the tray drive rails 308 and 310 secured to the chassis drive rails 414, such that media may be positioned in the media channel 304 on the drive tray 302.

Referring now to FIGS. 3, 6, 7a, 7d, and 7e, the method 700 then proceeds to step 706 where the optical drive apparatus 300 is coupled to an information handling system such as, for example, the information handling system 100, described above with reference to FIG. 1, housed in the information handling chassis 600. The drive tray 302 is moved in the direction D, and due to the slideable connection between the tray rails 308 and 310 with the rail mounts 306a and 306b, respectively, the drive tray 302 may be moved to a closed position F, illustrated in FIG. 7e, such that the media in the media channel 304 is protected. Moving the drive tray 302 into the closed position F results in the coupling of the hot swap connector 602 and the information handling system connector 312, illustrated in FIG. 7e, electrically coupling the drive tray 302 to the microprocessor 412 such that the optical drive mechanism 305 may send information read from the media in the media channel 304 to the microprocessor 412. In an embodiment, the chassis 600 and the drive tray 302 may include securing members for holding the drive tray 302 in the closed position F. In an embodiment, chassis 600 and/or the drive tray 302 may include release members for decoupling the hot swap connector 602 and the information handling system connector 312. The optical drive apparatus 300 may then be removed from the information handling system chassis 600 by activating a release device (not shown) which resiliently moves the drive tray securing members 414b out of the rail channels 414a such that the tray drive rails 308 and 310 may be removed from the rail channels 414a on the chassis drive rails 414. In an embodiment, the orientation of the chassis drive rails 414 may be standardized such that optical drive apparatus similar to the optical drive apparatus 300 from different manufacturers may be coupled to the chassis drive rails 414. Thus, a method an apparatus are provided which allow an optical drive apparatus 300 to be coupled to an information handling system chassis 600 free of a drive chassis, which allows the thickness of the information handling system chassis 600 to be reduced. In an experimental embodiment, the weight of the optical drive apparatus 300 was reduced by approximately 0.1 pounds relative to the conventional optical drive apparatus 200, and the thickness of the optical drive apparatus 300 was reduced by approximately 2.5 millimeters relative to the conventional optical drive apparatus 200. In an embodiment, the chassis drive rails 414, the drive bay 416, and the hot swap connection 602 are operable to accept a variety of different information handling system components such as, for example, a hard disk drive.

Figure 8A:
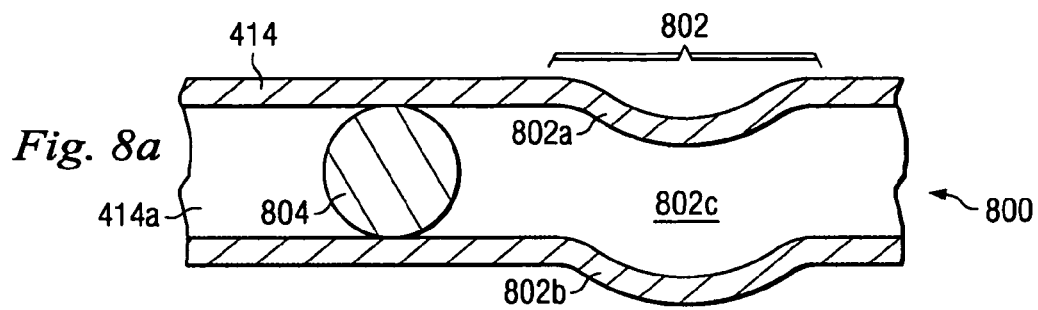
FIG. 8a is a cross sectional view illustrating an alternative embodiment for coupling the optical drive apparatus of FIG. 3 to the information handling system chassis of FIGS. 4 and 6.
Figure 8B:
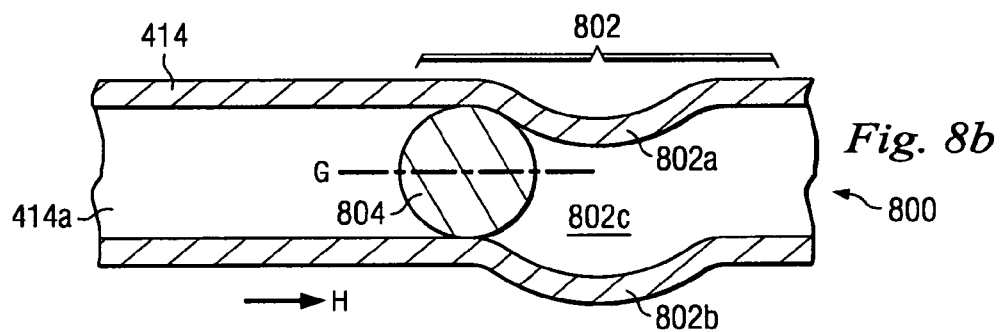
FIG. 8b is a cross sectional view illustrating an alternative embodiment for coupling the optical drive apparatus of FIG. 3 to the information handling system chassis of FIGS. 4 and 6.
Figure 8C:
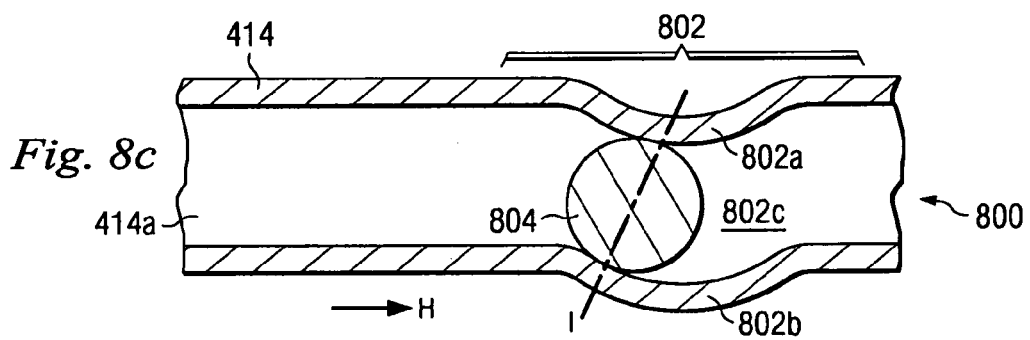
FIG. 8c is a cross sectional view illustrating an alternative embodiment for coupling the optical drive apparatus of FIG. 3 to the information handling system chassis of FIGS. 4 and 6.

Referring now to FIGS. 8a, 8b, and 8c, in an embodiment, a chassis drive rail 800 is illustrated that is substantially similar in design and operation to the chassis drive rail 414, described above with reference to FIGS. 4 and 6, with the provision of a drive tray securing member 802 replacing the drive tray securing member 414b. The drive tray securing member 802 includes a plurality of arcuate walls 802a and 802b which define a securing channel 802c between them. Furthermore, a chassis securing wheel 804 is added to the tray drive rails 308 and 310 or replaces the each of the tray drive rails 308 and 310 and are positioned on the rail mounts 306a adjacent the rear surface 302b of the drive tray 302. In operation, with the chassis securing wheel 804 in the rail channel 414a and the top surface 302e of the drive tray 302 in an orientation G with respect to the chassis securing wheel 804, moving the drive tray 302 in a direction H results in the securing wheel 804 engaging the arcuate walls 802a and 802b such that the securing wheel 804 cannot move through the securing channel 802c and the drive tray is secured in the chassis drive rail 414, illustrated in FIG. 8b. However, if the top surface 302e of the drive tray 302 is moved to an orientation I with respect to the securing wheel 804, the securing wheel 804 may enter the securing channel 802c, illustrated in FIG. 8c, such that the drive tray 302 may be moved in the direction H and the drive tray may be decoupled from the chassis drive rail 414. The drive tray 302 may then be coupled to the chassis drive rail 414 by performing the steps of FIGS. 8a, 8b, and 8c in reverse order.

Figure 9:
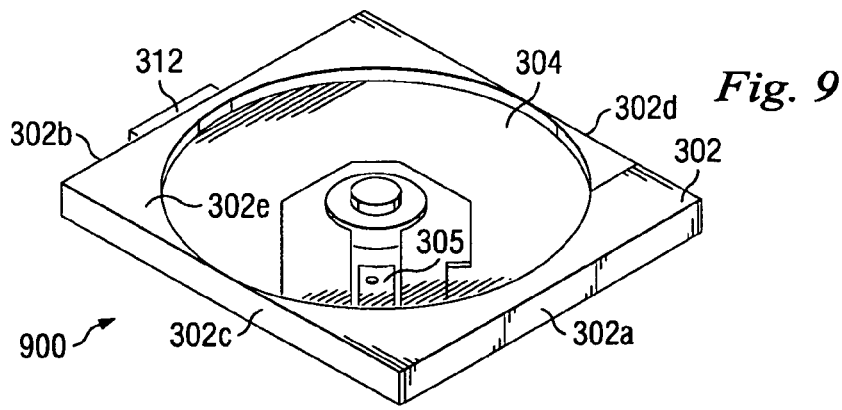
FIG. 9 is a perspective view illustrating an embodiment of an optical drive apparatus.
Figure 11B:
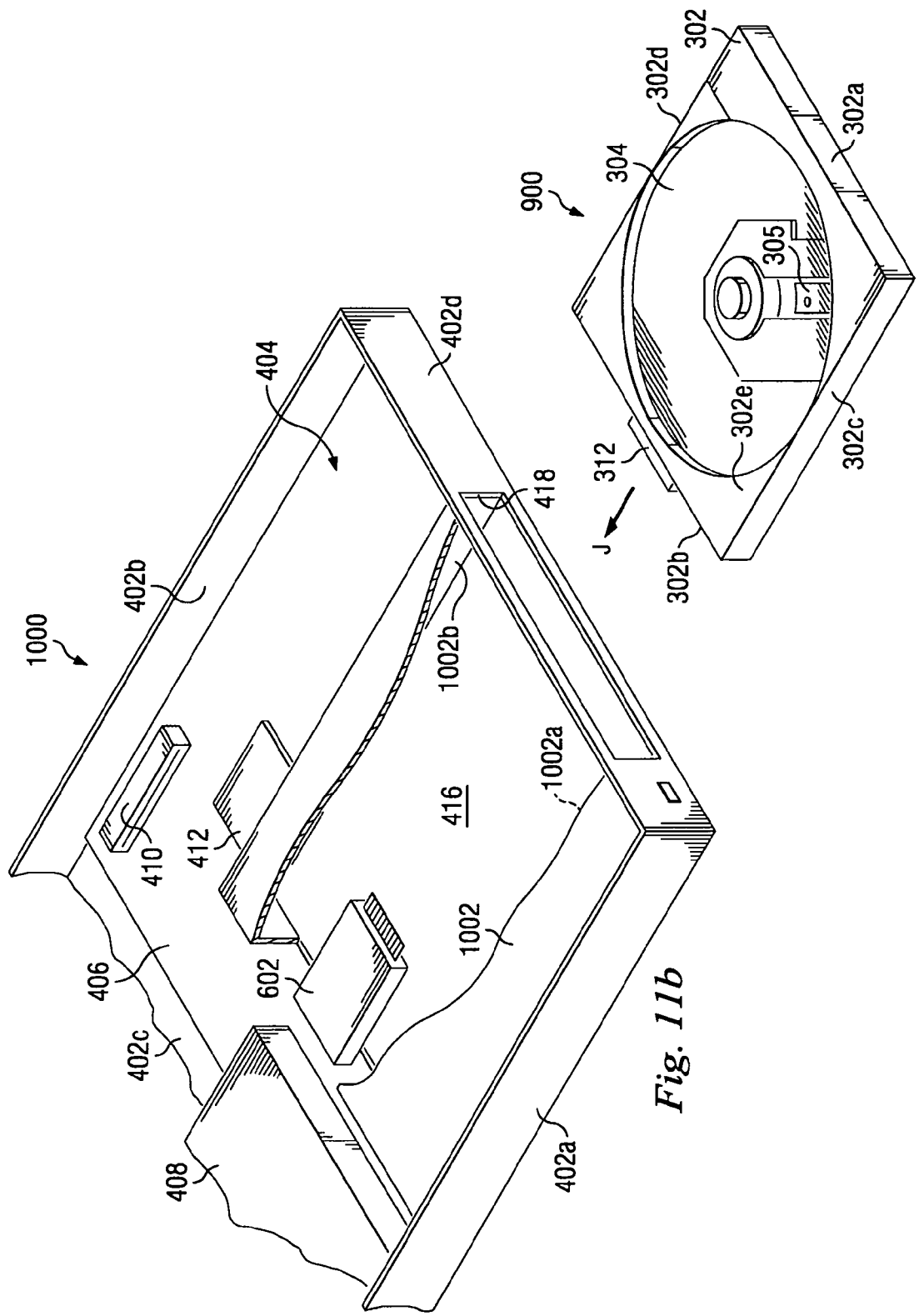
FIG. 11b is a perspective view illustrating an embodiment of the optical drive apparatus of FIG. 9 being coupled to the information handling system chassis of FIG. 10.
Figure 11C:
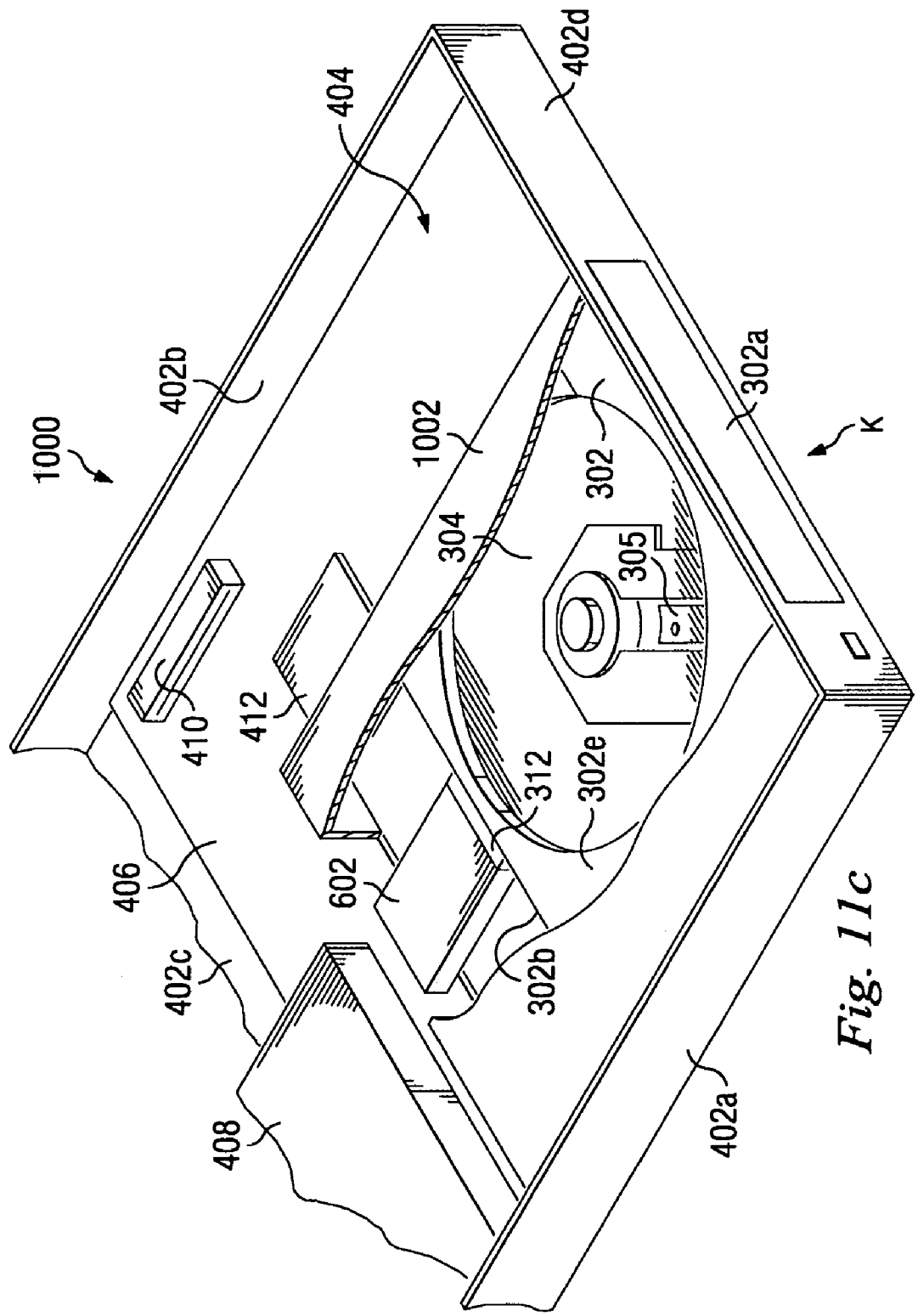
FIG. 11c is a perspective view illustrating an embodiment of the optical drive apparatus of FIG. 9 coupled to the information handling system chassis of FIG. 10 with the optical drive apparatus in a closed position.

Referring now to FIG. 9, in an embodiment, an optical drive apparatus 900 is illustrated that is substantially similar in design and operation to the optical drive apparatus 300, described above with reference to FIG. 3, but without the tray drive rails 308 and 310 and the rails mounts 306a and 306b on the drive tray 302. Furthermore, the side edge 302d of optical drive apparatus 900 extends further than the side edge 302d of optical drive apparatus 300 such that the media channel 304 defined by the drive tray 302 of optical drive apparatus 900 is substantially circular.

Referring now to FIG. 10, in an embodiment, an information handling system chassis 1000 is illustrated that is substantially similar in design and operation to the information handling system chassis 600, described above with reference to FIG. 6, with the provision of a drive bay housing 1002 replacing the chassis drive rails 414. The drive bay housing 1002 includes a plurality of side walls 1002a and 1002b which extend from opposite sides of the drive bay entrance 418 in a substantially parallel and spaced apart orientation and define the drive bay 416 between them.

Referring now to FIGS. 9, 10, 11a, and 11b, a method 1100 for coupling an optical drive to an information handling system chassis is illustrated. The method 1100 begins at step 1102 where the optical drive apparatus 900, illustrated in FIG. 9, is provided. The method 1100 then proceeds to step 1104, where the optical drive apparatus 900 is then inserted into the information handling system drive bay 416. Before insertion of the optical drive apparatus 900 into the information handling system drive bay 416, media may be positioned in the media channel 304 defined by the drive tray 302. Then, with the rear edge 302b of the drive tray 302 positioned adjacent the front surface 402d of the information handling system chassis 1000, illustrated in FIG. 11b, the drive tray 302 is moved in a direction J such that the rear edge 302b of the drive tray 302 enters the drive bay 416 through the drive bay entrance 418. Further movement of drive tray 302 in the direction J results in the drive tray 302 entering the drive bay 416, with the side edge 302c of the drive tray 302 engaging the side wall 1002a of the drive bay housing 1002 and the side edge 302d of the drive tray 302 engaging the side wall 1002b of the drive bay housing 1002.

Referring now to FIGS. 9, 10, 11a, and 11c, the method 1100 then proceeds to step 1106 where the optical drive apparatus 900 is coupled to an information handling system such as, for example, the information handling system 100, described above with reference to FIG. 1, housed in the information handling chassis 1000. The drive tray 302 is moved in the direction J, such that the drive tray 302 is moved to a closed position K, illustrated in FIG. 11c, and the media in the media channel 304 is protected. Moving the drive tray 302 into the closed position K results in the coupling of the hot swap connector 602 and the information handling system connector 312, illustrated in FIG. 11c, electrically coupling the drive tray 302 to the microprocessor 412 such that the optical drive mechanism 305 may send information read from media in the media channel to the microprocessor 412. In an embodiment, the information handling system chassis 1000 and the optical drive apparatus 900 may include securing members for holding the optical drive apparatus 900 in the closed position K. In an embodiment, information handling system chassis 1000 and/or the optical drive apparatus 900 may include a release device for decoupling the hot swap connector 602 and the information handling system connector 312. The optical drive apparatus 900 may then be removed from the information handling system chassis 1000 by activating the release device (not shown). In an embodiment, the orientation of the side walls 1002a and 1002b of the drive bay housing 1002 may be standardized such that optical drive apparatus similar to the optical drive apparatus 900 from different manufacturers may be positioned in the information handling system drive bay 416. Thus, a method an apparatus are provided which allow an optical drive apparatus 900 to be coupled to an information handling system chassis 1000 free of a drive chassis, which allows the thickness of the information handling system chassis 1000 to be reduced. In an experimental embodiment, the weight of the optical drive apparatus 900 was reduced by approximately 0.1 pounds relative to the conventional optical drive apparatus 200, and the thickness of the optical drive apparatus 900 was reduced by approximately 2.5 millimeters relative to the conventional optical drive apparatus 200. In an embodiment, the drive bay housing 1002, the drive bay 416, and the hot swap connection 602 are operable to accept a variety of different information handling system components such as, for example, a hard disk drive.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An optical drive apparatus, comprising:
    a chassis housing a processor, a storage device, and a system memory;
    an optical device drive bay defined by the chassis;
    a plurality of chassis drive rails mounted directly to the chassis and located in the optical device drive bay; and
    an optical drive tray defining an optical media channel and comprising an optical drive mechanism immediately adjacent the optical media channel and a plurality of tray drive rails that are operable to move relative to the optical drive tray, whereby the tray drive rails on the optical drive tray are connected directly to the chassis drive rails such that the optical drive tray is located in the optical device drive bay and operable to be moved out of the optical device drive bay free of a drive chassis.

2. The apparatus of claim 1, further comprising:
    an information handling system coupler located on the optical drive tray.

3. The apparatus of claim 2, wherein the information handling system coupler is a flexible circuit connector.

4. The apparatus of claim 2, wherein the information handling system coupler is a hot swap connector.

5. The apparatus of claim 1, wherein the tray drive rails are located on opposite sides of the optical drive tray.

6. The apparatus of claim 5, wherein the tray drive rails are slideably connected to the optical drive tray.

7. The apparatus of claim 5, wherein an information handling system securing member extends from the tray drive rails.

8. The apparatus of claim 1, wherein the tray drive rails comprise an information handling system securing wheel.

9. An information handling system, comprising:
    an information handling system chassis housing a processor, a hard disk, and a memory, and comprising a keyboard, a trackpad, and a display coupled to the processor;
    an optical device drive bay defined by the information handling system chassis;
    a pair of spaced apart chassis drive rails extending from the information handling system chassis and located in the optical device drive bay; and
    an optical drive tray defining an optical media channel and comprising an optical drive mechanism immediately adjacent the optical media channel and a plurality of tray drive rails that are operable to move relative to the optical drive tray, whereby the tray drive rails on the optical drive tray are connected directly to the chassis drive rails such that the optical drive tray is located in the optical device drive bay between the chassis spaced apart drive rails and is operable to be moved out of the optical device drive bay free of a drive chassis.

10. The system of claim 9, further comprising:
    an information handling system coupler located on the optical drive tray.

11. The system of claim 10, wherein the information handling system coupler is a flexible circuit connector.

12. The system of claim 10, wherein the information handling system coupler is a hot swap connector.

13. The system of claim 9, wherein the tray drive rails are located on opposite sides of the optical drive tray.

14. The system of claim 13, wherein the tray drive rails are slideably connected to the optical drive tray.

15. The system of claim 13, wherein an information handling system securing member extends from the tray drive rails.

16. The system of claim 9, wherein the tray drive rails comprise an information handling system securing wheel.

17. The system of claim 9, wherein the chassis spaced apart drive rails comprise a drive tray securing member.

18. The system of claim 9, further comprising:
    a flexible circuit connection coupled to the processor and to the optical drive mechanism.

19. The system of claim 9, further comprising:
    a hot swap connection coupled to the processor and to the optical drive mechanism.

20. A method for coupling an optical drive to an information handling system chassis, comprising:
    providing an information handling system chassis housing a processor, a storage device, and a memory, wherein the information handling system chassis defines a optical device drive bay that houses a plurality of chassis drive rails that extend directly from the information handling system chassis;
    directly connecting a plurality of tray drive rails to the chassis drive rails, wherein the tray drive rails are moveably connected to an optical drive tray that defines an optical media channel and comprises an optical drive mechanism immediately adjacent the optical media channel;
    directly connecting the optical drive tray to the information handling system chassis free of a drive chassis by coupling the tray drive rails to the chassis drive rails; and
    moving the optical drive tray relative to the to tray drive rails in order to move the optical drive tray out of the optical device drive bay.

21. The method of claim 20, further comprising:
    coupling the optical drive mechanism to an information handling system with a flexible circuit connection.

22. The method of claim 20, further comprising:
    coupling the optical drive mechanism to an information handling system with a hot swap connection.

* * * * *

UNITED STATES PATENT AND TRADEMARK OFFICE
CERTIFICATE OF CORRECTION

PATENT NO.       : 7,639,491 B2                                                      Page 1 of 1
APPLICATION NO.  : 11/392391
DATED            : December 29, 2009
INVENTOR(S)      : Mundt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 689 days.

Signed and Sealed this

Twenty-first Day of December, 2010

David J. Kappos
*Director of the United States Patent and Trademark Office*